United States Patent
Kajiwara et al.

(10) Patent No.: US 6,698,968 B2
(45) Date of Patent: Mar. 2, 2004

(54) FRAME SECTION JOINING STRUCTURE

(75) Inventors: Kazutomo Kajiwara, Nagoya (JP); Yuzo Konishi, Toyota (JP); Kiyohito Morimoto, Toyota (JP); Seiji Sakai, Toyota (JP); Terutsugu Gotanda, Kariya (JP); Shinichi Haneda, Anjo (JP); Kazuo Mori, Kariya (JP); Kazunari Azuchi, Himi (JP); Kazunobu Nuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/988,730

(22) Filed: Nov. 20, 2001

(65) Prior Publication Data

US 2002/0061223 A1 May 23, 2002

(30) Foreign Application Priority Data

Nov. 21, 2000 (JP) ........................................ 2000-354823
Nov. 13, 2001 (JP) ........................................ 2001-347479

(51) Int. Cl.⁷ .............................................. B60R 19/04
(52) U.S. Cl. ........................ 403/337; 293/155; 296/29
(58) Field of Search ................................. 403/335–338; 293/155; 296/29

(56) References Cited

U.S. PATENT DOCUMENTS 5,271,650 A * 12/1993 Fukuhara et al. ............ 293/120
6,299,226 B1 * 10/2001 Kroning et al. ............. 293/120
2003/0034661 A1 * 2/2003 Gotanda et al. ............. 293/155

FOREIGN PATENT DOCUMENTS

JP 2000-53017 2/2000

* cited by examiner

*Primary Examiner*—John R. Cottingham
(74) *Attorney, Agent, or Firm*—Oliff & Berridge, PLC

(57) ABSTRACT

A first frame section is hollow and has a substantially uniform polygonal cross-sectional shape. An axial load is applied to the first frame section. A second frame section is hollow and has a substantially uniform polygonal cross-sectional shape. The axial load is transmitted from the first frame section to the second frame section. A transmitting portion is provided in at least one of the first and second frame sections. The transmitting portion receives the axial load that acts on each edge of the first frame section and transmits the axial load to each edge of the second frame section.

12 Claims, 3 Drawing Sheets

FRAME SECTION JOINING STRUCTURE

BACKGROUND OF THE INVENTION

The present invention relates to structures for joining a plurality of frame sections substantially along the axes of the frame sections.

Typically, vehicle frame sections are joined together substantially along the axes of the frame sections. More specifically, a pair of frame sections are joined together such that an axial edge of one frame section an adjacent axial edge of the other are substantially aligned at each corner portion of the frame sections. In this manner, when an axial load is applied to one frame section and the load focally acts on corresponding edges of the frame section, the load is reliably transmitted to adjacent edges of the other frame section.

However, since only limited space is allowed for the frame sections and the vehicle appearance need be improved, the joined frame sections do not always have identical cross-sectional shapes (dimensions). If this is the case, the frame sections cannot be joined together such that the adjacent edges are substantially aligned. Further, even if the frame sections have identical cross-sectional shapes, size variation among the frame sections may hamper such arrangement. That is, the adjacent edges of the joined frame sections are located offset from each other.

If the load applied to one frame section cannot reliably be transmitted to the adjacent frame section, the load may deform the frame sections.

BRIEF SUMMARY OF THE INVENTION

Accordingly, it is an objective of the present invention to provide a frame section joining structure that reliably transmits a load applied to one frame section to an adjacent frame section.

To achieve the foregoing and other objectives and in accordance with the purpose of the present invention, the present invention is a frame section joining structure for joining a plurality of frame sections with each other. The joining structure has a first frame section and a second frame section. The first frame section has a hollow cross section and an open end. An axial load is applied to the first frame section. A first bracket is provided at the open end of the first frame section. A second frame section has a hollow cross section and an open end. A second bracket is provided at the open end of the second frame section. The axial load applied to the first frame section is transmitted to the second frame section through the first bracket and the second bracket. The second bracket has a transmitting portion that extends toward the inside of the cross section of the second frame section. At least a part of axially projected cross section of the first frame section overlaps the transmitting portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention, which is applied to a vehicle front portion, will now be described with reference to FIGS. 1 to 4.

Figure 4:
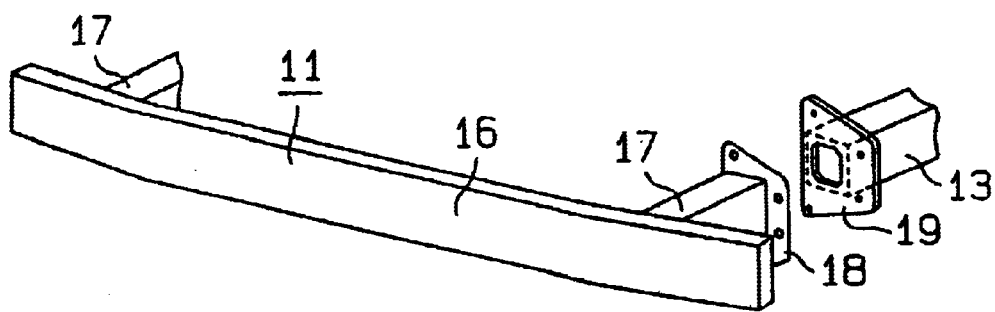
FIG. 4 is a perspective view showing a vehicle front portion to which the embodiment of FIG. 1 is applied.

FIG. 4 is a perspective view showing the vehicle front portion. As shown in the drawing, the front portion includes a bumper frame 11 and a pair of side members 13 (only one is shown), each of which forms a body frame section of the vehicle.

The bumper frame 11 includes a bumper reinforce 16 that extends in a lateral direction of the vehicle. The bumper frame 11 also has a pair of hollow crush boxes 17 each of which is connected to a lateral end of the bumper reinforce 16. The axis of each crush box 17 extends in a fore-and-aft direction of the vehicle. Each crush box 17 forms a first frame section. A first bracket 18 through which bolts are fastened is secured to the rear end of each crush box 17.

Each side member 13 forms a second frame section. The axis of the side member 13 substantially corresponds to the axis of the corresponding crush box 17. Each side member 13 is hollow and has a substantially square cross-sectional shape. A second bracket 19 through which the bolts are fastened is secured to the front end of each side member 13. The second bracket 19 of each side member 13 matches the first bracket 18 of the associated crush box 17. Thus, when the first bracket 18 of each crush box 17 and the second bracket 19 of the associated side member 13 are fastened together, the bumper frame 11 is secured to the vehicle body.

If an impact is applied to the vehicle body from its front due to, for example, a car crash, the impact is transmitted to the body (the side members 13) through the crush boxes 17 of the bumper frame 11, thus acting as an axial load. In this state, each crush box 17 axially deforms, or crushes, to dampen the impact that is transmitted to the body. This absorbs the energy generated by the impact that otherwise affects the body and the passengers.

Figure 1:
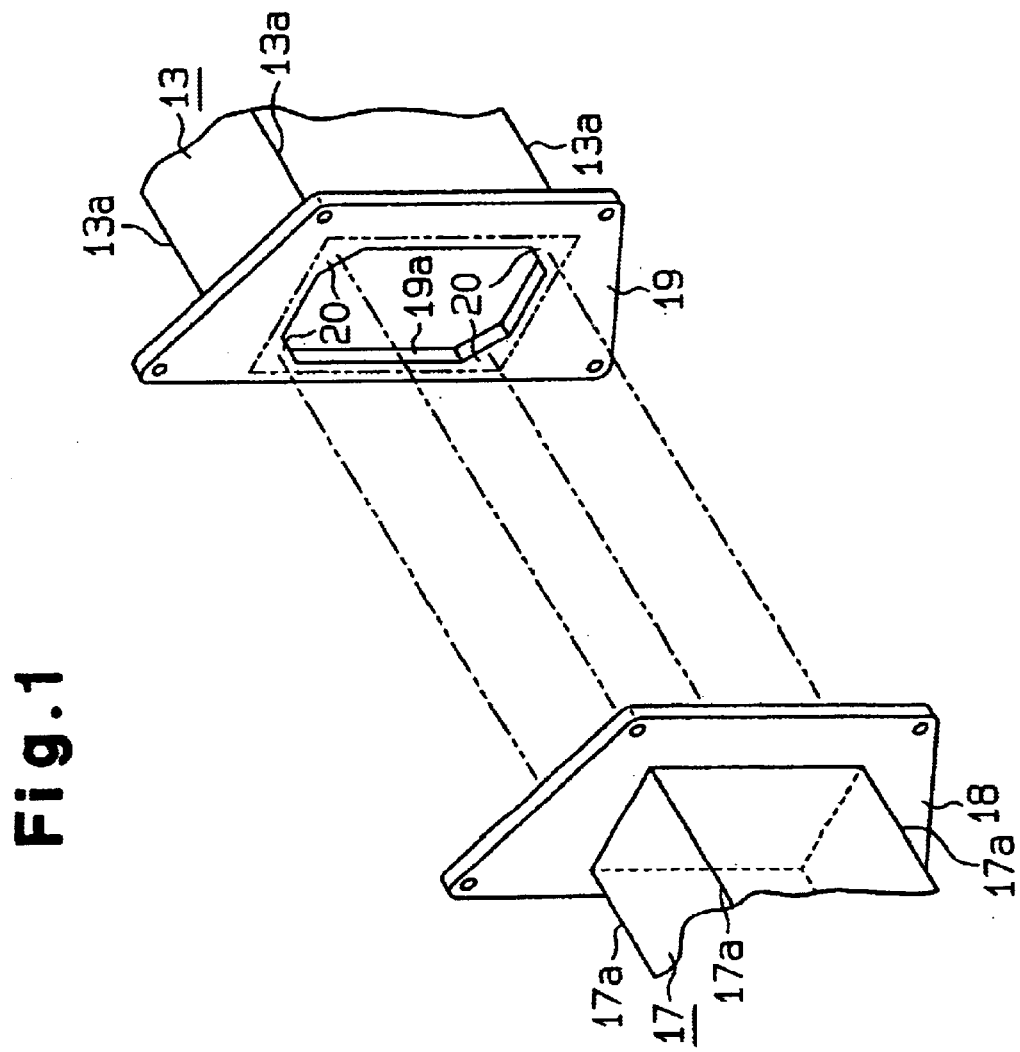
FIG. 1 is an exploded perspective view showing an embodiment of the present invention.
Figure 2:
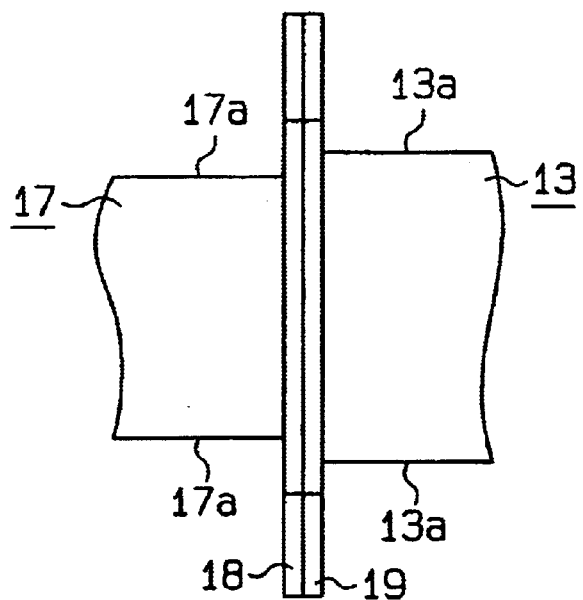
FIG. 2 is a side view showing the embodiment of FIG. 1.
Figure 3A:
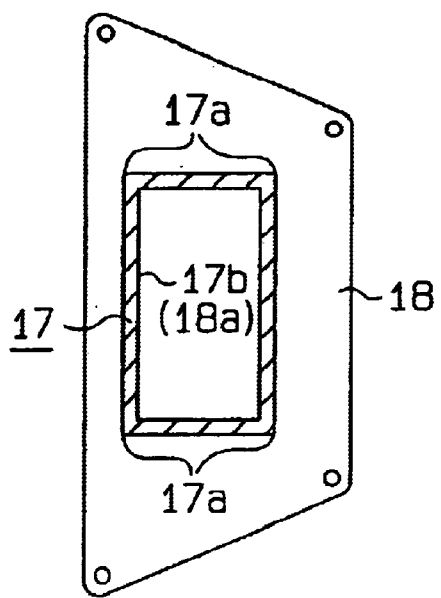
FIG. 3(a) is a front cross-sectional view showing a crush box of the embodiment of FIG. 1.
Figure 3B:
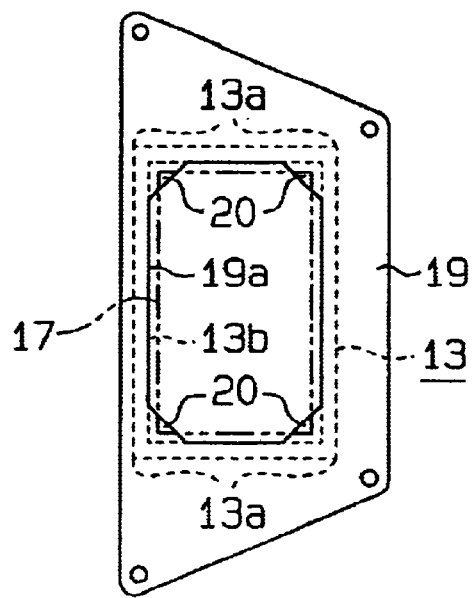
FIG. 3(b) is a front view showing a side member of the embodiment of FIG. 1.

A structure for joining each crush box 17 with the associated side member 13 will be described with reference to FIGS. 1 to 3. FIG. 1 is an exploded perspective view showing a structure for joining each side member 13 with the associated crush box 17. FIG. 2 is a side view showing the structure of FIG. 1. FIG. 3(a) is a front cross-sectional view showing a portion of each crush box 17 (and the associated first bracket 18). FIG. 3(b) is a front view showing each side member 13 (and the associated second bracket 19).

As shown in FIGS. 1 and 3(a), each crush box 17 has a substantially square cross-sectional shape and includes four corners or four edges 17a that are substantially parallel with the axis of the crush box 17. As shown in FIG. 3(a), the first bracket 18 of each crush box 17 has a bracket hole 18a that matches the cross-sectional shape of an inner side 17b of the crush box 17. The bracket hole 18a of each first bracket 18 reduces the weight of the first bracket 18 and decreases the material required for the first bracket 18. An axial load is transmitted from each crush box 17 to the associated first bracket 18 through the walls of the bracket hole 18a. During the transmission, the distribution state of the load is substantially maintained. That is, since the axial load focally acts on the edges 17a of each crush box 17, the axial load is transmitted to the corresponding first bracket 18 while the load is substantially maintained in a state in which the load focally acts on the corners or edges 17a.

As shown in FIGS. 2 and 3(b), each side member 13 has a substantially square cross-sectional shape that is slightly larger than the cross-sectional shape of each crush box 17 in elongated and lateral sides. Each side member 13 includes four corners or four edges 13a that are substantially parallel with the axis of the side member 13. As shown in FIG. 3(b), the second bracket 19 of each side member 13 has a bracket hole 19a that matches the cross-sectional shape of an inner side 13b of the side member 13. The bracket hole 19a of each second bracket 19 reduces the weight of the second bracket 19 and decreases the material required for the second bracket 19.

As shown in FIG. 3(b), a transmitting portion 20 is formed integrally with each corner of the bracket hole 19a of each second bracket 19. Each transmitting portion 20 has a substantially triangular shape and projects toward the inside of the cross section of the side member to connect the adjacent walls of the bracket hole 19a. Each transmitting portion 20 is located to cover a part of the open end of each side member 13. As indicated by the double-dotted broken lines in the drawing, when the first bracket 18 of each crush box 17 and the second bracket 19 of the associated side member 13 are joined together, the corners (the edges 17a) of the crush box 17 is located at positions corresponding to the transmitting portions 20 of the second bracket 19. That is, the corners of the crush box 17, which form a part of axially projected cross section of the crush box 17, overlap the corresponding transmitting portions 20 of the second bracket 19. The dimensions of each transmitting portion 20 are selected to compensate an offset arrangement between the axis of each crush box 17 and the axis of the associated side member 13 due to, for example, size variation, within the area of the transmitting portion 20.

After the axial load is transmitted from each crush box 17 to the associated first bracket 18, the axial load is further transmitted to the second bracket 19 of the associated side member 13. In this state, each transmitting portion 20 of the second bracket 19 receives the axial load, which focally acts on the edges 17a of the associated crush box 17, at the entire area of the transmitting portion 20. The axial load is then transmitted from the transmitting portions 20 to the side member 13 while the axial load is maintained in a state acting focally on each edge 13a of the side member 13 In this manner, the axial load is reliably transmitted from each edge 17a of each crush box 17 to each edge 13a of the associated side member 13 through the transmitting portions 20. In other words, the axial load is reliably transmitted from each crush box 17 to the associated side member 13.

As described, the embodiment of FIGS. 1 to 4 has the following effects.

(1) In the illustrated embodiment, the second bracket 19 of each side member 13 includes the transmitting portions 20. The corners of the crush box 17, which form a part of axially projected cross section of the crush box 17, overlap the corresponding transmitting portions 20. Each transmitting portion 20 receives the axial load that focally acts on each edge 17a of the associated crush box 17 and transmits the load to each edge 13a of the side member 13. That is, the axial load is reliably transmitted from the edges 17a of each crush box 17 to the edges 13a of the associated side member 13 through the transmitting portions 20. This prevents each side member 13 from being deformed by a load that is transmitted to the side member 13 in an undesired manner.

(2) In the illustrated embodiment, each crush box 17 has the square cross-sectional shape. The corners of the crush box 17 overlap the corresponding transmitting portions 20. Accordingly, the axial load is reliably transmitted from each crush box 17 to the associated side member 13 through the transmitting portions 20.

(3) In the illustrated embodiment, each transmitting portion 20 is formed simply by connecting the adjacent walls of the bracket hole 19a of each second bracket.

(4) In the illustrated embodiment, even if the axis of each crush box 17 and the axis of the associated side member 13 are located offset from each other due to, for example, size variation, each transmitting portion 20 compensates this offset arrangement.

The present invention is not restricted to the illustrated embodiment but may be embodied in the following modifications.

Figure 5:
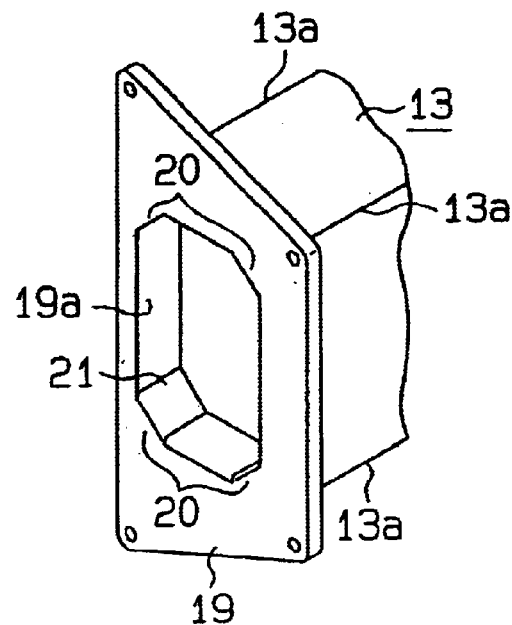
FIG. 5 is a cross-sectional view showing a portion of a modification of the embodiment of FIG. 1.

In the illustrated embodiment, a plurality of reinforcing projections 21 may project from the inner periphery of an opening surrounded by each transmitting portion 20 of the second bracket 19, as shown in FIG. 5. Each projection 21 extends toward the inside of the side member 13 through the open end of the side member 13. To form each projection 21, a projecting piece is first formed integrally with each corner of the bracket hole 19a of each second bracket 19 to project from the end of each transmitting portion 20 toward the middle of the bracket hole 19a. The projecting piece is then bent to project along the axis of the side member 13, thus forming the projection 21. The projection 21 thus projects substantially perpendicular to the associated transmitting portion 20. Each projection 21 increases the rigidity of each transmitting portion 20. Accordingly, in addition to the effects of the illustrated embodiment, each projection 21 suppresses deformation of the associated transmitting portion 20 when the axial load, which focally acts on each edge 17a of the associated crush box 17, is transmitted to the transmitting portion 20.

Although each transmitting portion 20 has a substantially triangular shape in the illustrated embodiment, the shape of the transmitting portion 20 is not restricted to this. Each transmitting portion 20 may have any shape, as long as the transmitting portion 20 connects the adjacent walls of the bracket hole 19a of each second bracket 19 for receiving the axial load, which focally acts on the edges 17a of the associated crush box 17.

In the illustrated embodiment, each transmitting portion 20 is formed corresponding to each corner of the crush box 17. However, the transmitting portion may be formed corresponding to a part of the corners of the crush box 17. In this case, the same effects as those of the illustrated embodiment are obtained.

In the illustrated embodiment, each side member 13 has a substantially square cross-sectional shape that is slightly larger than the cross-sectional shape of each crush box 17 in elongated and lateral sides. However, the side members 13 and the crush boxes 17 have identical cross-sectional shapes. If this is the case, each first bracket 18 must include transmitting portions corresponding to the transmitting portions 20 of the associated second bracket 19. Each crush box 17 is joined with the associated side member 13 such that each edge 17a and the corresponding edge 13a are substantially aligned. If the axis of each crush box 17 is offset from the axis of the associated side member 13 due to size variation or the like, the axial load that acts on the edge 17a of the crush box 17 that is offset inward from the corresponding edge 13a of the side member 13 is transmitted to the edge 13a through the corresponding transmitting portion 20. In contrast, the axial load that acts on the edge 17a of the crush box 17 that is offset outward from the corresponding edge 13a of the associated side member 13 is transmitted to the edge 13a through the corresponding transmitting portion of the first bracket 18. In these cases, the same effects as those of the illustrated embodiment are obtained.

In the illustrated embodiment, the crush boxes 17 and the side members 13 have substantially square cross-sectional shapes. However, the crush boxes 17 and the side members 13 may have other polygonal cross-sectional shapes such as substantially triangular or pentagonal cross-sectional shapes. In these cases, the same effects as those of the illustrated embodiment are ensured.

Each corner of polygonal cross section of the crush boxes 17 and the side members 13 may be rounded. The crush boxes 17 and the side members 13 may have circular cross-sectional shapes. In these cases, the same effects as those of the illustrated embodiment are ensured.

In the illustrated embodiment, the present invention is applied to joining of each crush box 17 with the associated side member 13. However, the present invention may be applied to joining of other objects, for example, other vehicle body sections such as side, front, and rear sections. That is, the present invention may be applied to joining of any frame sections between which an axial load is transferred. In any case, the same effects as those of the illustrated embodiment are ensured.

In the illustrated embodiment, the present invention is applied to the front section of the vehicle body. However, the present invention may be applied to a rear section of the vehicle body. Further, other than vehicle components, the present invention may be applied to construction materials. In each case, the same effects as those of the illustrated embodiment are obtained.

The present examples and embodiments are to be considered as illustrative and not restrictive and the invention is not to be limited to the details given herein, but may be modified within the scope and equivalence of the appended claims.

What is claimed is:

1. A frame section joining structure for joining a plurality of frame sections with each other, the frame section joining structure comprises:
    a first frame section having a hollow cross section and an open end, such that an axial load is applied to the first frame section;
    a first bracket having a hole provided at the open end of the first frame section;
    a second frame section having a hollow cross section and an open end; and
    a second bracket having a hole provided at the open end of the second frame section, wherein the axial load applied to the first frame section is transmitted to the second frame section through the first bracket and the second bracket, the second bracket has a transmitting portion that covers a part of a cross section of the second frame section, and at least a part of axially projected cross section of the first frame section overlaps the transmitting portion to reliably transmit axial loads.

2. The frame section joining structure according to claim 1, wherein the first frame section has a polygonal cross section and a plurality of corners, wherein at least one of the corners overlaps associated transmitting portion.

3. The frame section joining structure according to claim 1, wherein a reinforce section is formed at the transmitting portion to suppress deformation of the transmitting portion when the axial load is transmitted to the transmitting portion.

4. The frame section joining structure according to claim 2, wherein a reinforce section is formed at the transmitting portion to suppress deformation of the transmitting portion when the axial load is transmitted to the transmitting portion.

5. The frame section joining structure according to claim 3, wherein the transmitting portion is located to cover a part of the open end of the second frame section.

6. The frame section joining structure according to claim 5, wherein the reinforce section is bent from the transmitting portion toward the inside of the second frame section through the open end of the second frame section.

7. A frame section joining structure for joining a plurality of frame sections with each other, the frame section joining structure comprises:
    a first frame section having a hollow and polygonal cross section and an open end, such that an axial load is applied to the first frame section;
    a first bracket having a hole provided at the open end of the first frame section;
    a second frame section having a hollow and polygonal cross section and an open end; and
    a second bracket having a hole provided at the open end of the second frame section, wherein the second bracket overlaps the first bracket to transmit the axial load applied to the first frame section to the second frame section through the first and the second brackets, wherein the second bracket has a transmitting portion that covers a part of a cross section of the second frame section, and wherein at least a part of axially projected cross section of the first frame section overlaps the transmitting portion to reliably transmit axial leads.

8. The frame section joining structure according to claim 7, wherein the first frame section has a plurality of corners, at least one of the corners overlaps associated transmitting portion.

9. The frame section joining structure according to claim 7, wherein a reinforce section is formed at the transmitting portion to suppress deformation of the transmitting portion when the axial load is transmitted to the transmitting portion.

10. The frame section joining structure according to claim 8, wherein a reinforce section is formed at the transmitting portion to suppress deformation of the transmitting portion when the axial load is transmitted to the transmitting portion.

11. The frame section joining structure according to claim 9, wherein the transmitting portion is located to cover a part of the open end of the second frame section.

12. The frame section joining structure according to claim 11, wherein the reinforce section is bent from the transmitting portion toward the inside of the second frame section through the open end of the second frame section.

* * * * *